UNITED STATES PATENT OFFICE.

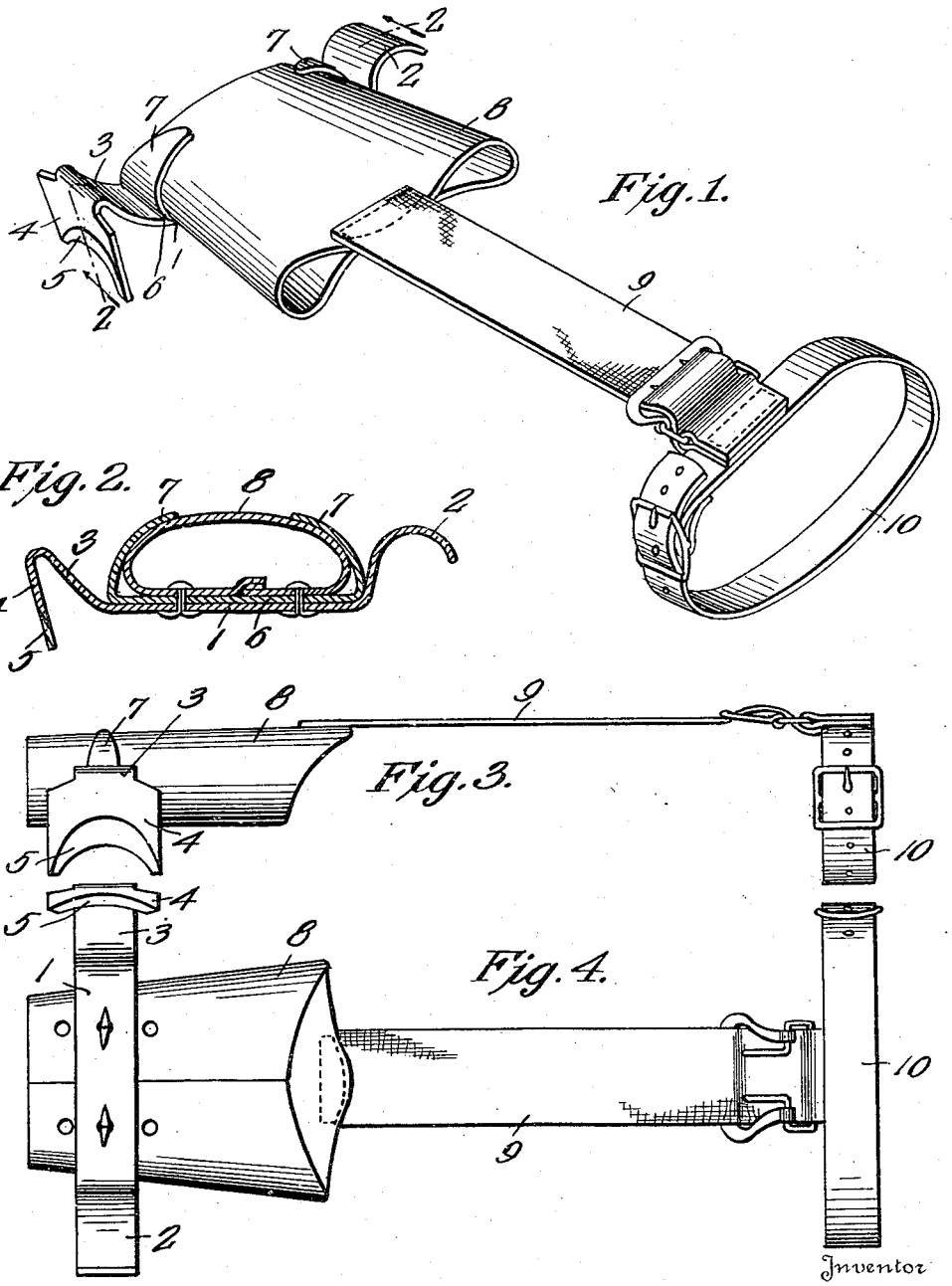

GEORGE L. CURTIS, OF NEVADA CITY, CALIFORNIA, ASSIGNOR OF ONE-FOURTH TO MATT WHEELIHAN AND ONE-FOURTH TO JOHN H. McLEAN, OF NEVADA CITY, CALIFORNIA.

FRUIT-PICKER.

1,210,768.  Specification of Letters Patent.  Patented Jan. 2, 1917.

Application filed June 1, 1916. Serial No. 101,071.

*To all whom it may concern:*

Be it known that I, GEORGE L. CURTIS, a citizen of the United States, residing at Nevada City, in the county of Nevada, State of California, have invented certain new and useful Improvements in Fruit-Pickers; and I do hereby declare the following to be a full, clear, and exact description of the invention, such as will enable others skilled in the art to which it appertains to make and use the same.

The present invention is directed to improvements in fruit picking devices, and has for its object to provide a device of this character adapted to be engaged with the fingers of both the hands so that the fruit can be conveniently picked with either hand and held in the hand immediately after picking so that it can be deposited in a suitable receptacle.

A further object of the invention is to provide a device of this character which is constructed in such a manner that it can be attached to the hands of the user and will be held thereon in such a manner as to not interfere with the free use of the hand while picking the fruit and further to provide a device which will not accidentally become disengaged from the hand.

A still further object is the provision of a fruit picker particularly adapted for picking bunches of grapes so that the bunch of grapes after being severed from the stem can be held in the hand to be subsequently placed in a suitable receptacle.

With these and other objects in view, this invention resides in the novel features of construction, formation, combination and arrangement of parts to be hereinafter more fully described, claimed and illustrated in the accompanying drawing, in which:

Figure 1 is a perspective view of the device. Fig. 2 is a sectional view on line 2—2 of Fig. 1. Fig. 3 is an end view. Fig. 4 is a bottom plan view.

The device consists of a bar 1, said bar having one of its ends terminating in a finger rest 2, while the other end thereof is bent upwardly as at 3 and terminates in a plate 4, said plate having its lower edge provided with a curved cutting edge 5. Suitably connected to the bar 1 is a bar 6, said bar having its ends provided with curved finger rests 7, said rests being spaced a sufficient distance apart to accommodate the first and second fingers, and since these rests engage over the fingers it is obvious that the bar 1 will be held properly engaged with the fingers and disposed at right angles thereto so that the plate 4 will be properly positioned with respect to the thumb of the hand, whereby the cutting edge 5 can be engaged with the stem of the fruit and upon forcing the thumb and cutting edge together it is obvious that the stem will be severed and the fruit can be held in the hand having the device engaged therewith. To prevent the device from slipping accidentally from the fingers a flexible casing 8 preferably of leather is secured to the bar 6, and to the rear edge of this casing is secured an elastic strip 9, said strip being adjustably connected to a strap 10 which is engaged around the wrist and since the first and second fingers are engaged in the casing 8 it is obvious that the device will be held in place. The bar 6 is preferably formed from pliable metal so that it can be bent to fit fingers of different sizes.

What is claimed is:—

A device of the class described comprising a bar, one end of said bar having a finger rest carried thereby the other end of said bar terminating in an angularly disposed plate, said plate having a curved cutting edge carried thereby, a second bar fixed longitudinally of the first named bar and having pliable finger rests upon its ends, a flexible casing connected to the second named bar and between the last named finger rests which engage therewith, a strap adapted to be engaged with the wrist of the user, and a strip of elastic fabric connecting the casing and strap.

In testimony whereof, I affix my signature, in the presence of two witnesses.

GEORGE L. CURTIS.

Witnesses:
GEO. B. FINNEGAN,
MABEL FREEMAN.

Copies of this patent may be obtained for five cents each, by addressing the "Commissioner of Patents, Washington, D. C."